Patented May 1, 1934

1,956,905

UNITED STATES PATENT OFFICE 1,956,905

PREFORMED ABRASIVES, AND PROCESS OF PRODUCING THE SAME

Edmund S. Merriam, Marietta, Ohio

No Drawing. Application August 24, 1933, Serial No. 686,660

7 Claims. (Cl. 51—280)

This invention relates to improved pre-formed abrasive articles and process for producing the same.

Until recently in the manufacture of abrasive articles such as grinding wheels, sectors, hones and the like, it has been the practice to bond together a mass of abrasive grains. The abrasive grains conventionally used being generally aluminum oxide or silicon carbide. The abrasive grains of this type have been held together by some sort of bonding agent. The bond most generally employed being a ceramic material resembling porcelain. In some instances bakelite, shellac and various compositions of water glass have been used.

In abrasive articles so formed the cutting material of the article is the abrasive grains used. The bonding agent by which the grains are held together is much softer than the grains themselves and serves merely to hold them in place. Of necessity abrasive articles made in this manner are of high density. The bonding material furthermore, more or less surrounds each individual grain. It is thus substantially continuous. The free space in such articles may amount to from 35 to 50% of the gross volume of the article. Increased porosity has in some instances been obtained by incorporating sawdust or the like into the articles before firing the kiln. Sawdust burns away lowering the density. In such cases, however, the essential nature of the abrasive article and its mode of construction remains unchanged.

In a copending application filed by me, Serial No. 623,305, filed July 18, 1932, I have described an abrasive article in which the grains of aluminum oxide are united by an autogenous bond consisting of further fused aluminum oxide formed by the burning of metallic aluminum dispersed through the abrasive grains. Abrasive articles made in accordance with this process can be made of any desired grade and of about the usual degree of density, although for a given hardness they can be made considerably more porous than possible where a weaker bond is employed.

It is the purpose of the present invention to provide an abrasive article which may be of either "actual" or "virtual" porosity of an extremely high degree. By "virtual" porosity I mean an abrasive article in which the pores are filled with a substance much softer than the abrasive material itself. By "actual" porosity it is intended to define an abrasive article wherein the pores are open.

In accordance with my present invention I propose to form an abrasive article in which the bonding material constitutes the abrasive while the grains are employed to provide porosity.

The objective of my present invention can be attained by several modes of operation. A few illustrative examples will suffice.

If it is desired to make an abrasive wheel for example of "virtual" porosity, I may take quartz grains and mix therewith metallic aluminum in the form of a finely divided metal or in the form of a coating on the grains. The mixture may be effected through the addition of a suitable adhesive such as dextrine, bakelite, water glass, collodian or the like. The mixture is then molded or formed into the shape of the article desired and dried. After drying the metallic aluminum is ignited and burned in a manner such as illustrated and described in my prior application above identified.

The quantity of the metallic aluminum can be so regulated that the final temperature attained upon ignition of the metallic aluminum will not reach the fusion point of silica. I have found it profitable to use metallic aluminum and quartz grains in the proportions of approximately six parts of metallic aluminum to each one hundred parts of quartz grains. These proportions are not fixed, but may be varied within more or less wide limits. The product produced by the steps thus far described consists of an article in which the quartz grains are united by a more or less continuous bond of fused aluminum oxide. There may well be a slight reaction of the quartz with the fused aluminum oxide possibly producing some mullite. In the main, however, the aluminum oxide formed has the properties of corundum. The heat of reaction fractures the quartz grains to a more or less powdery condition and they apparently are converted in part at least to crystobalite. The density of the article can be controlled by incorporating in the mixture more or less aluminum oxide grains. Such aluminum oxide grains should be fine and mixed with metallic aluminum and the latter mixture incorporated with the larger quartz grains. The addition of the aluminum oxide is of course optional. Quartz has a hardness of about 7 on the mineral scale and is therefore much softer than the aluminum oxide. The quartz content of an abrasive article will therefore wear away much faster than the aluminum oxide and present at all times a rough free cutting surface consisting of greatly distributed aluminum oxide. This precludes the danger of glazing so frequently encountered in the use of abrasives of this general character. An abrasive article formed in accordance with the foregoing illustration I have defined as possessing "virtual" porosity.

It is of course apparent that other materials than quartz grains may be utilized in the manufacture of abrasive articles in accordance with the present invention. Such materials should have a high melting point and should not react readily with the aluminum oxide formed by burning the metallic aluminum. Bauxite, refractory clays and grains of calcined infusorial earth may be used.

In all instances the novel abrasive article formed in accordance with the present invention is characterized by the fact that the grains are soft and the bonding material hard. The reverse is generally true of abrasive articles heretofore manufactured.

An abrasive article possessing "actual" porosity can be obtained in several ways. For example, if grains of marble, dolomite or magnesite of suitable size are substituted for the quartz grains in the example hereinbefore described, such materials will, during the reaction, be largely converted into CaO and $CO_2$. The $CO_2$ of course passes off with the $O_2$, but the lime or other oxide will remain. Whenever this oxide is soluble in water or dilute acids or ammonium salts, it may be dissolved out of the abrasive article. The fused aluminum oxide resists acids, whereas the usual type of bond is weakened thereby. The final product in accordance with this second mode of operation will take the form of an open skeleton-like structure of aluminum oxide.

In some instances a combustible material such as sawdust, charcoal, anthracite and the like may be employed in lieu of quartz grains. In such cases, however, it is necessary to account for the additional heat generated by the combustion of such material in order to avoid complete liquefaction.

Bauxite and diaspore which are hydrated oxides of aluminum are well fitted for use in making abrasive articles in accordance with the present invention. Such materials are first calcined to expel the water. Bauxite, is clay-like; when fused and purified, it provides the abrasive grains usually employed. Its partial fusion in carrying out the method of the present invention results simply in the addition to the available abrasive material. The bulk of the bauxite, however, remains unfused and soft providing a highly desirable degree of "virtual" porosity.

The foregoing illustrations will suffice to demonstrate the method in which the invention can be carried into effect. It is, of course, apparent that the porosity, "actual" or "virtual", of the finished abrasive article can be directly controlled and abrasive articles of any desired porosity produced. It is regarded as an important feature of the invention that in the finished abrasive article the abrasive material constitutes the bonding agent which is formed in situ around the filler.

The manner of and means for igniting and burning the metallic aluminum in the pre-formed mixture will be fully understood by reference to my copending application above identified and needs no repetition here.

What I claim as my invention is:—

1. A preformed abrasive article comprising a skeleton-like structure of aluminum oxide formed in situ about a softer less dense medium.

2. A preformed abrasive article characterized by the fact that the abrasive material is aluminum oxide formed in situ as a continuous bond for added softer material.

3. A preformed abrasive article comprising quartz grains bonded together by aluminum oxide formed in situ by burning metallic aluminum.

4. A preformed abrasive article comprising grains of material of a normally non-abrasive character bonded together by a substantially continuous bond of aluminum oxide formed in situ by burning metallic aluminum.

5. A method for forming preformed abrasives comprising mixing grains of a normally non-abrasive material with metallic aluminum then burning the metallic aluminum to form a skeleton like bond of aluminum oxide.

6. A method for forming preformed abrasive articles comprising dispersing metallic aluminum through grains of a normally non-abrasive material, then burning the metallic aluminum to form a skeleton-like structure of a high degree of porosity.

7. A method for forming preformed abrasive articles comprising dispersing metallic aluminum through grains of a normally non-abrasive material, then burning the metallic aluminum and finally dissolving out the non-abrasive material to form a skeleton-like structure of a high degree of porosity.

EDMUND S. MERRIAM.